United States Patent
Li et al.

(10) Patent No.: US 11,941,905 B2
(45) Date of Patent: Mar. 26, 2024

(54) SYSTEMS AND METHODS FOR EXTRACTING PATCHES FROM DIGITAL IMAGES

(71) Applicant: Walmart Apollo, LLC, Bentonville, AR (US)

(72) Inventors: Qian Li, Sunnyvale, CA (US); Samrat Kokkula, Santa Clara, CA (US); Abon Chaudhuri, Sunnyvale, CA (US); Ashley Kim, San Francisco, CA (US); Alessandro Magnani, Menlo Park, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 308 days.

(21) Appl. No.: 17/368,691

(22) Filed: Jul. 6, 2021

(65) Prior Publication Data
US 2023/0017280 A1    Jan. 19, 2023

(51) Int. Cl.
G06K 9/00    (2022.01)
G06F 18/2321    (2023.01)
(Continued)

(52) U.S. Cl.
CPC .......... *G06V 40/10* (2022.01); *G06F 18/2321* (2023.01); *G06N 7/01* (2023.01);
(Continued)

(58) Field of Classification Search
CPC .......... G06V 40/10; G06T 7/194; G06T 7/11; G06T 11/60; G06N 7/01; G06F 18/2321
See application file for complete search history.

(56) References Cited

U.S. PATENT DOCUMENTS 10,096,122 B1 * 10/2018 Agrawal .................. G06T 7/90
2014/0314313 A1 * 10/2014 Kennedy ............. G06V 40/103
382/173
(Continued)

FOREIGN PATENT DOCUMENTS

KR    102110893    4/2010

OTHER PUBLICATIONS

Kalantidis, Y., et al. "Getting the Look: Clothing Recognition and Segmentation for Automatic Product Suggestions in Everyday Photos," Conference in Proceedings of International Conference on Multimedia Retrieval (ICMR), Apr. 2013, 8 pgs. Apr. 2013.
(Continued)

*Primary Examiner* — David F Dunphy
(74) *Attorney, Agent, or Firm* — BRYAN CAVE LEIGHTON PAISNER LLP

(57) ABSTRACT

Systems and methods including one or more processors and one or more non-transitory storage devices storing computing instructions configured to run on the one or more processors and perform acts of receiving one or more digital images; identifying a foreground of the one or more digital images; analyzing the foreground of the one or more digital images to identify a skin region in the foreground of the one or more digital images; when the skin region is identified, clustering a non-skin remainder of the foreground of the one or more digital images into one or more clusters; extracting one or more patches of the one or more digital images from the one or more clusters of the foreground of the one or more digital images; determining one or more scores for the one or more patches of the one or more digital images; and coordinating displaying a patch of the one or more patches on an electronic display based on the one or more scores for the one or more patches. Other embodiments are disclosed herein.

20 Claims, 5 Drawing Sheets

(51) Int. Cl.
  *G06N 7/00*   (2023.01)
  *G06N 7/01*   (2023.01)
  *G06T 7/11*   (2017.01)
  *G06T 7/194*  (2017.01)
  *G06T 11/60*  (2006.01)
  *G06V 40/10*  (2022.01)

(52) U.S. Cl.
  CPC ................ *G06T 7/11* (2017.01); *G06T 7/194* (2017.01); *G06T 11/60* (2013.01)

(56) References Cited

U.S. PATENT DOCUMENTS

2015/0106235 A1*  4/2015  Gershon ............ G06Q 30/0643
                                                    705/26.63
2019/0294916 A1    9/2019  Zhang

OTHER PUBLICATIONS

Rother, C., et al., "GrabCut: Interactive Foreground Extracting Using Interated Graph Cuts," ACM Transactions on Graphics, Aug. 2004, 7 pgs. Aug. 2004.
Hernandez-Vela, A., et al., "GrabCut-Based Human Segmentation in Video Sequences," Sensors 2012, 12, 15376-16393; doi:10.3390/s121115376, 19 pgs. 2012.

* cited by examiner

SYSTEMS AND METHODS FOR EXTRACTING PATCHES FROM DIGITAL IMAGES

TECHNICAL FIELD

This disclosure relates generally to machine vision applications, and more particularly to identification of patches in digital images.

BACKGROUND

Machine vision systems have long been able to identify items displayed in digital images. For example, machine vision systems have been developed to identify items in an image and then perform web searches for the item. Extracting representative patches from these images, though, presents a number of problems not solved by conventional machine vision systems. For example, many conventional systems extract non-representative patches, patches that are not from the item of interest, or patches that contain portions of two or more items. As another example, many conventional machine vision systems use processor intensive algorithms that run poorly on systems with slow processors (e.g., mobile devices). Therefore, there is a need for more accurate patch extraction systems.

BRIEF DESCRIPTION OF THE DRAWINGS

To facilitate further description of the embodiments, the following drawings are provided in which.

Figure 1:
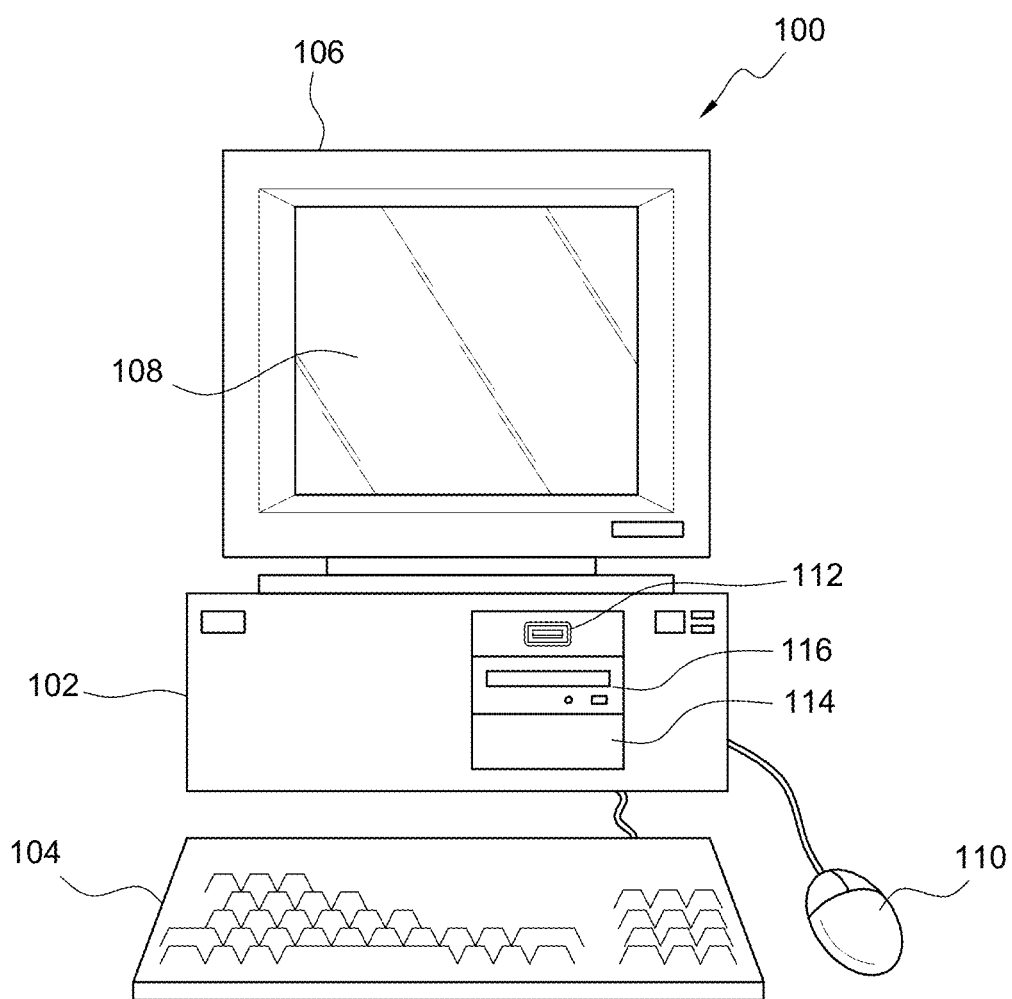
FIG. 1 illustrates a front elevational view of a computer system that is suitable for implementing various embodiments of the systems disclosed in FIGS. 3 and 5.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform receiving one or more digital images; identifying a foreground of the one or more digital images; analyzing the foreground of the one or more digital images to identify a skin region in the foreground of the one or more digital images; when the skin region is identified, clustering a non-skin remainder of the foreground of the one or more digital images into one or more clusters; extracting one or more patches of the one or more digital images from the one or more clusters of the foreground of the one or more digital images; determining one or more scores for the one or more patches of the one or more digital images; and coordinating displaying a patch of the one or more patches on an electronic display based on the one or more scores for the one or more patches.

Various embodiments include a method. The method can be implemented via execution of computing instructions configured to run at one or more processors and configured to be stored at non-transitory computer-readable media The method can comprise receiving one or more digital images; identifying a foreground of the one or more digital images; analyzing the foreground of the one or more digital images to identify a skin region in the foreground of the one or more digital images; when the skin region is identified, clustering a non-skin remainder of the foreground of the one or more digital images into one or more clusters; extracting one or more patches of the one or more digital images from the one or more clusters of the foreground of the one or more digital images; determining one or more scores for the one or more patches of the one or more digital images; and coordinating displaying a patch of the one or more patches on an electronic display based on the one or more scores for the one or more patches.

Figure 2:
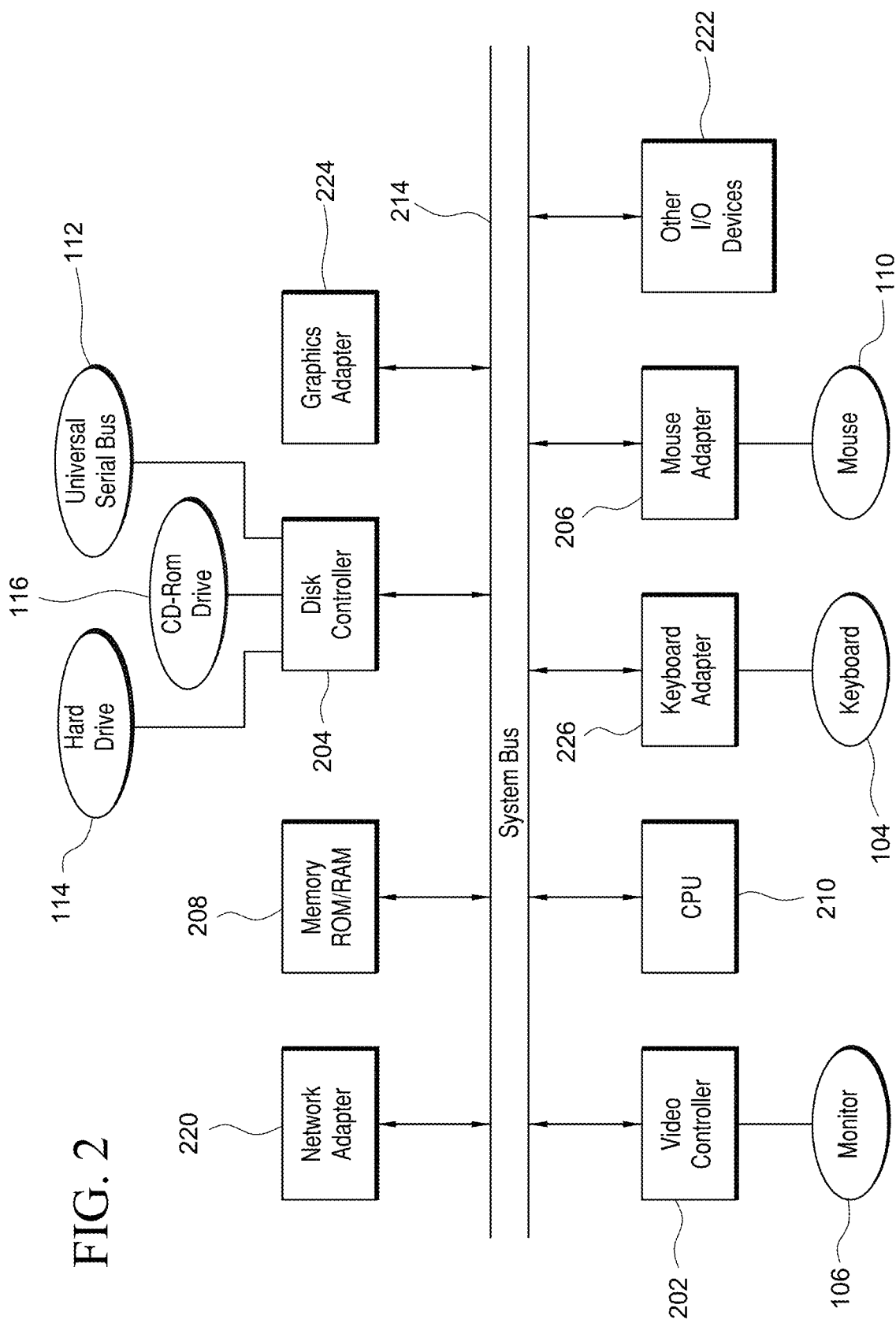
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) porb 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc.

In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bub 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
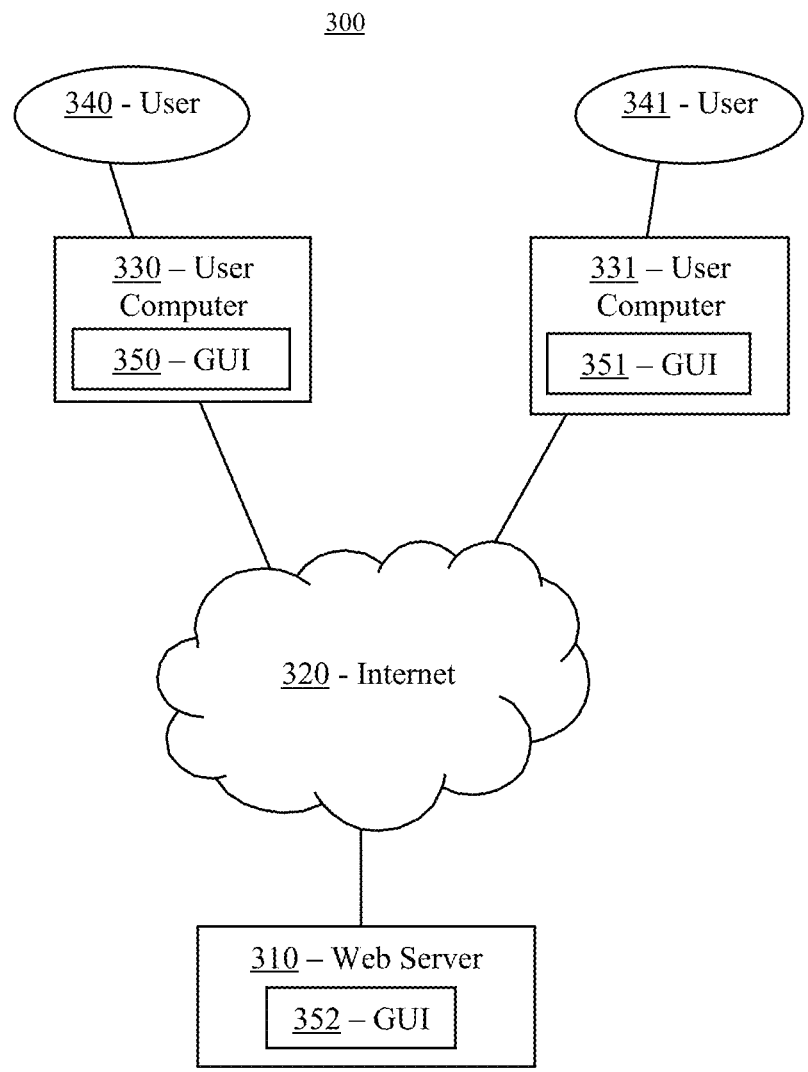
FIG. 3 illustrates a representative block diagram of a system, according to an embodiment.

Turning ahead in the drawings, FIG. 3 illustrates a block diagram of a system 300 that can be employed for extracting patches from digital images, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a web server 310. Web server 310 can be a computer system, such as computer system 100 (FIG. 1), as described above, and can be a single computer, a single server, or a cluster or collection of computers or servers, or a cloud of computers or servers. In another embodiment, a single computer system can host each of two or more of web server 310. Additional details regarding web server 310 are described herein.

In many embodiments, system 300 also can comprise user computers 330, 331. In other embodiments, user computers 330, 331 are external to system 300. User computers 330, 331 can comprise any of the elements described in relation to computer system 100. In some embodiments, user computers 330, 331 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons. In various embodiments, user computers 330, 331 can comprise a display that is smaller than monitor 106 (FIG. 1), thereby facilitating mobility.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interface ("GUI") 350, 351, 352. In the same or different embodiments, GUI 350, 351, 352 can be part of and/or displayed by user computers 330, 331, which also can be part of system 300, and/or web server 310. In some embodiments, GUI 350, 351, 352 can comprise text and/or graphics (image) based user interfaces. In the same or different embodiments, GUI 350, 351, 352 can comprise a heads up display ("HUD"). When GUI 350, 351, 352 comprises a HUD, GUI 350, 351, 352 can be projected onto a medium (e.g., glass, plastic, etc.), displayed in midair as a hologram, or displayed on a display (e.g., monitor 106 (FIG. 1)). In various embodiments, GUI 350, 351, 352 can be color, black and white, and/or greyscale. In many embodiments, GUI 350, 351, 352 can comprise an application running on a computer system, such as computer system 100 (FIG. 1), user computers 330, 331, and/or server computer 310. In the same or different embodiments, GUI 350, 351, 352 can comprise a website accessed through internet 320. In some embodiments, GUI 350, 351, 352 can comprise an eCommerce website. In these or other embodiments, GUI 350, 351, 352 can comprise an administrative (e.g., back end) GUI allowing an administrator to modify and/or change one or more settings in system 300. In the same or different embodiments, GUI 350, 351, 352 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 310 can be in data communication through Internet 320 with user computers 330, 331. In certain embodiments, user computers 330, 331 can be desktop computers, laptop computers, smart phones, tablet devices, and/or other endpoint devices. Web server 310 can host one or more websites. For example, web server 310 can host an eCommerce website that allows users to browse and/or search for products, to add products to an electronic shopping cart, and/or to purchase products, in addition to other suitable activities.

In many embodiments, web server 310 and/or user computers 330, 331 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage device(s) of web server 310 and/or user computers 330, 331 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of web server 310 and/or user computers 330, 331. In a similar manner, the processing module(s) and the memory storage module(s) can be local and/or remote to each other.

In many embodiments, web server 310 can be configured to communicate with one or more user computers 330, 331. In some embodiments, user computers 340 and 341 also can be referred to as customer computers. In some embodiments, web server 310 can communicate or interface (e.g., interact) with one or more customer computers (such as user computers 330, 331) through a network (e.g., internet 320). Internet 320 can be an intranet that is not open to the public. In further embodiments, Internet 320 can be a mesh network of individual systems. Accordingly, in many embodiments, web server 310 (and/or the software used by such systems)

can refer to a back end of system 300 operated by an operator and/or administrator of system 300, and user computers 330, 331 (and/or the software used by such systems) can refer to a front end of system 300 used by one or more users 340, 341, respectively. In some embodiments, users 340, 341 can also be referred to as customers, in which case, user computers 330, 331 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, web server 310 and/or user computers 330, 331 can also be configured to communicate with one or more databases. The one or more databases can comprise a product database that contains information about products, items, or SKUs (stock keeping units) sold by a retailer. In some embodiments, data can be deleted from a database when it becomes older than a maximum age. In many embodiments, a maximum age can be determined by an administrator of system 300. In various embodiments, data collected in real-time can be streamed to a database for storage.

In many embodiments, one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s). In various embodiments, databases can be stored in a cache (e.g., MegaCache) for immediate retrieval on-demand.

The one or more databases can each comprise a structured (e.g., indexed) collection of data and can be managed by any suitable database management systems configured to define, create, query, organize, update, and manage database(s).

Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between web server 310 and/or user computers 330, 331, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

In many embodiments, the techniques described herein can provide a practical application and several technological improvements. In some embodiments, the techniques described herein can provide systems and methods for more accurate and easier to process patch extractions. These techniques described herein can provide a significant improvement over conventional approaches of patch extraction, such as manual extraction of patches.

In a number of embodiments, the techniques described herein can solve a technical problem that arises only within the realm of computer systems, as digital images do not exist outside the realm of computer networks.

Figure 4:
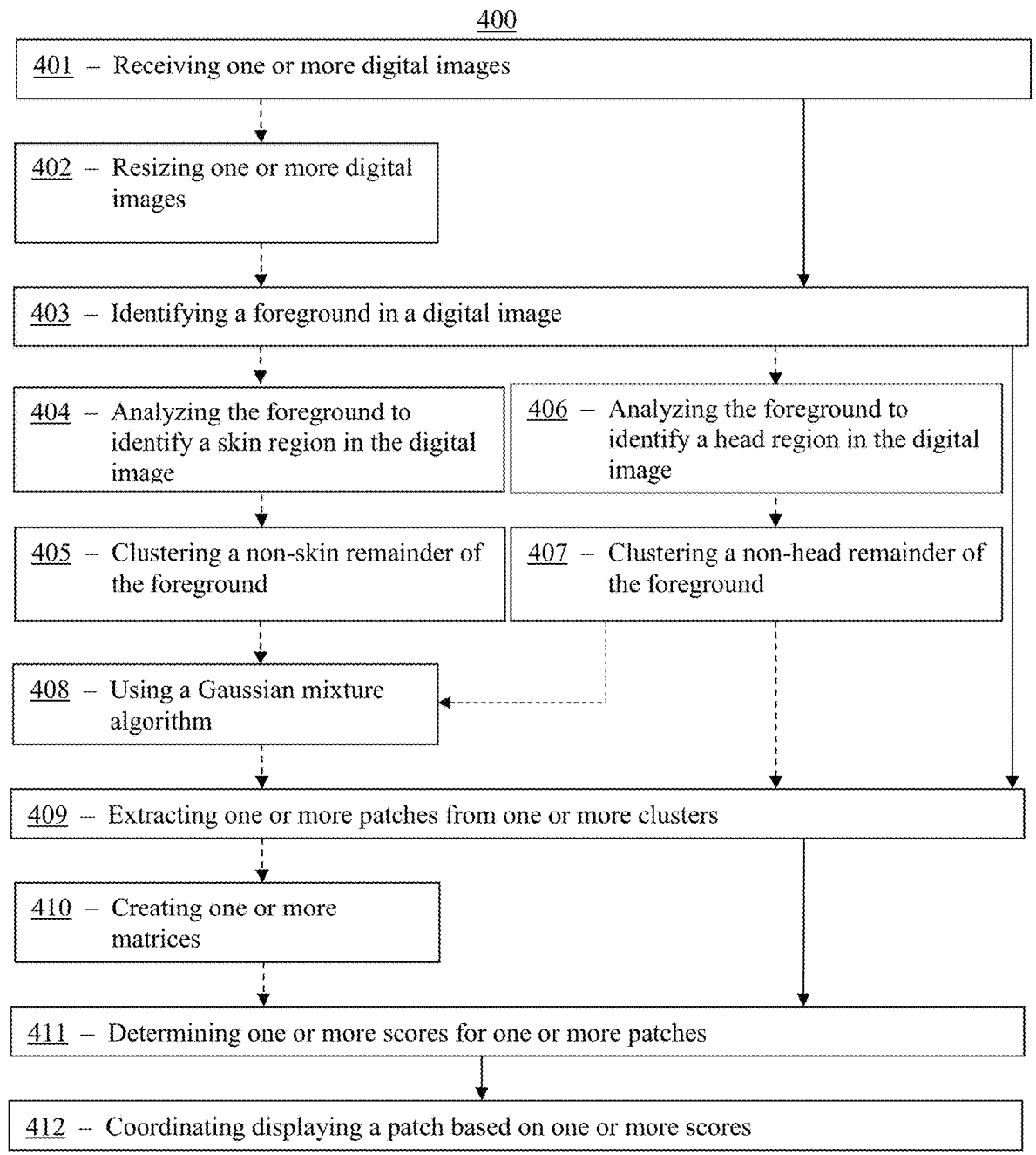
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as web server 310 and/or user computers 330, 331 (FIG. 3). The processing module(s) can be similar or identical to the processing module(s) described above with respect to computer system 100 (FIG. 1).

In many embodiments, method 400 can comprise an activity 401 of receiving one or more digital images. In some embodiments, one or more digital images can be received from one or more devices internal to system 300 (FIG. 3) and/or one or more devices external to system 300 (FIG. 3). For example, one or more digital images can be received from a repository of digital images maintained and/or managed by an administrator of system 300 (FIG. 3). As another example, one or more digital images can be received from a third party electronic device (e.g., from a third party seller on an eCommerce marketplace run on system 300 (FIG. 3)). In many embodiments, one or more digital images can be submitted to system 300 (FIG. 3) via a third party access portal. For example, images can be submitted to system 300 (FIG. 3) via a back-end GUI accessible by a third party user. In many embodiments, digital images can be automatically received via an application programming interface (API) associated with system 300 (FIG. 3). In various embodiments additional digital information can be received with digital images. In these or other embodiments, additional digital information can comprise information about an item displayed in the digital information. For example, digital images can be received with a title, a description, dimensions, a composition, a price, etc. In various embodiments, an image can be received in a number of different formats (e.g., gif, jpg, raw, etc.) and/or a number of different sizes.

In some embodiments, method 400 can optionally comprise an activity 402 of resizing one or more digital images. In some embodiments, digital images can be resized to a smaller size or a larger size. In various embodiments, digital images can be resized to facilitate better processing. For example, images can be resized to a smaller size so that downstream predictive algorithms can be completed before they become outdated. As another example, digital images that are resized to a larger size can have their resolution reduced to facilitate similar efficiencies in downstream predictive algorithms. In another embodiment, activity 402 can comprise resizing one or more digital images to a common size.

In many embodiments, after activity 401 and optionally after activity 402, method 400 can comprise an activity 403 of identifying a foreground in a digital image. In some embodiments, a foreground in a digital image can be identified using one or more image segmentation algorithms. Generally speaking, image segmentation algorithms are configured to divide a digital image into one or more segments (e.g., a foreground and a background or more complex identifications of subjects for each segment in the digital image). These image segmentation algorithms can fall into a number of non-exclusive types. For example, an image segmentation algorithm can comprise a thresholding algorithm and/or a clustering algorithm. In various embodiments, a thresholding image segmentation algorithm can divide an image into one or more segments based on one or more threshold values. In many embodiments, the threshold values can comprise various colorimetric properties of the digital image (e.g., red, green, blue ("RGB") components; grayscale components; black vs white components; hue, saturation, value ("HSV") components; luma, blue-difference, and red-difference components ("YCbCr"), etc.). In these or other embodiments, threshold values between pixels can be calculated for adjacent pixels. In various embodiments, threshold values between pixels can be weighted based on a distance between the pixels. For example, threshold values between pixels that are closer together in a digital image can be weighted higher than threshold values between pixels that are further apart from each other in the digital image.

In various embodiments, a thresholding image segmentation algorithm can comprise a OpenCV GrabCut algorithm. Generally speaking, an OpenCV GrabCut algorithm can begin by drawing a bounding box around a foreground portion of a digital image. Anything outside of the bounding box can then be designated as sure background while an interior of the bounding box is unknown. An interior of the bounding box can then be analyzed using one or more probabilistic models. Generally speaking, a probabilistic model used to analyze an interior of a bounding box and determine whether a pixel in the interior of the bounding box belongs to a foreground segment or a background segment. For example, a Gaussian Mixture Model can be used as the probabilistic model. A graph can then be generated using an output of a probabilistic model. In many embodiments, each node on a graph can correlate with a pixel in a digital image and edge weights between each node can correlate with a probability that the two nodes belong in a same segment. For example, two pixels likely to be in a foreground of a digital image will have a higher edge weight than one pixel likely to be in the foreground and one pixel likely to be in a background of the digital image. In various embodiments, a graph can then be segmented such that nodes with edge weights under a predetermined threshold are segmented into different segments. For example, a mincut algorithm (e.g., an algorithm configured $t_o$ partition nodes of a graph along some minimal metric) can be used to segment a graph into different segments. More information about an OpenCV GrabCut algorithm can be found in Rother et al., "GrabCut": interactive foreground extraction using iterated graph cuts, 23 ACM Transitions on Graphics 3 (Aug. 2004), which is herein incorporated by this reference in its entirety.

In some embodiments, after activity 403, method 400 can optionally comprise an activity 404 of analyzing the foreground in the digital image to identify a skin region in the digital image. In various embodiments, a skin region in a digital image can be determined using one or more colorimetric properties of a digital image. For example, a predetermined range of the one or more colorimetric properties can be used to identify a skin region in a digital image. In various embodiments, any pixels within the predetermined color range can be labeled as the skin region. In these or other embodiments, a predetermined color range can be bounded by one or more threshold colorimetric values, and any pixel with a colorimetric value above or below the one or more threshold colorimetric values can be labeled as a skin region. For example, Dahmani et al., Zero-sum Game Theory Model for Segmenting Skin Regions, 99 Image and Vision Computing 103925 (2020), which is herein incorporated by this referenced in its entirety, describes a number of threshold colorimetric values useful in activity 404.

In some embodiments, method 400 can optionally comprise an activity 405 of clustering a non-skin remainder of the foreground of the digital image. In many embodiments, activity 405 can be performed after or at a same time as activity 404. In these or other embodiments, activity 405 can be triggered by successful completion of all or a part of activity 404. In various embodiments, a non-skin remainder of a foreground can comprise a portion of a digital image identified as a foreground (e.g. such as in activity 403) and not in a skin region (e.g., such as in activity 404). In other words, in some embodiments, a background and a skin region of a digital image can be excluded from activity 405. Generally speaking, clustering algorithms (i.e. techniques for performing a clustering analysis) are configured to group sets of objects such that similar objects are grouped together into clusters. A number of different metrics exist for performing a clustering analysis on digital images. For example, colorimetric properties of the digital image can be used to create a similarity metric between one or more portions of the digital image (e.g., segments, pixels, groups of pixels, etc.), a distance between the one or more portions of the digital image can be used to create the similarity metric, and/or a machine learning algorithm can be trained to calculate the similarity metric based on one or more inputs.

In many embodiments, a machine learning algorithm can be trained on one or more digital images. In some embodiments, training a machine learning algorithm can comprise estimating internal parameters of a model configured to cluster portions of a digital image. In various embodiments, a machine learning algorithm can be trained using labeled training data, otherwise known as a training dataset. In many embodiments, a training dataset can comprise digital images with one or more identified clusters. In this way, a machine learning algorithm can be configured to accurately cluster one or more portions of a digital image. In the same or different embodiments, a pre-trained machine learning algorithm can be used, and the pre-trained algorithm can be re-trained on the labeled training data. In many embodiments, a machine learning algorithm can be iteratively trained in real time as data is added to a training data set. In various embodiments, a machine learning algorithm can be trained, at least in part, on images of a specific item, a class of items, and/or similar items. For example, a machine learning algorithm can be trained on images of skirts, t-shirts, pants, etc. In this way, a machine learning algorithm tailored to a specific item or a class of items user can be generated. In the same or different embodiments, a machine learning algorithm tailored to a specific item can be used as a pre-trained algorithm for a similar item. In several embodiments, due to a large amount of data needed to create and maintain a training data set, a machine learning model can use extensive data inputs to cluster one or more digital images. Due to these extensive data inputs, in many embodiments, creating, training, and/or using a machine learning algorithm configured to cluster one or more digital images cannot practically be performed in a mind of a human being.

In many embodiments, cascading machine learning algorithms can be used. Generally speaking, cascading machine learning algorithms can comprise two more machine learning algorithms concatenated together. For example, an output from a first machine learning algorithm can be fed as input into a second machine learning algorithm. In this way, a more accurate machine learning algorithm can be created because each subsequent machine learning algorithm incorporates the features examined by the previous machine learning algorithm(s).

In some embodiments, after activity 403, method 400 can optionally comprise an activity 406 of analyzing the foreground of the digital image to identify a head region in the digital image. In many embodiments, activity 406 can be performed after or at a same time as activity 404. In these or other embodiments, activity 406 can be triggered by failure of all or a part of activity 404.

In various embodiments, a head region can be identified using one or more facial recognition algorithms. For example, if a facial recognition algorithm detects a face, then the face can be labeled as a head region. There are a number of facial recognition algorithms known in the art that can be used. In various embodiments, one or more facial recognition algorithms can use a face template to detect a face. For example, a representative template comprising facial features (eyes, nose, cheekbones, jaw, etc.) can be overlaid onto an image to identify a face. In some embodiments, one or more facial recognition algorithms can compare suspected facial features in an image to identify a face. For example, an algorithm can analyze a relative position, size, and/or shape of an image's eyes, nose, cheekbones, and/or jaw. In some embodiments, suspected facial features in a digital image can be detected using one or more segmentation algorithms (e.g., as described in activities 403-404). In these or other embodiments, one or more facial recognition algorithms can use a statistical approach to analyze a face. For example, an image can be converted into different types of values (e.g., one or more vectors or some other multidimensional notation) and statistical algorithms (e.g., predictive, machine learning, etc.) can be used to identify a face. In some embodiments, a facial recognition algorithm can comprise all or a part of a facial recognition software library. For example, all or a part of the OpenCV software library can be used to identify a face.

In some embodiments, cascading machine learning algorithms, as described above, can be used as a facial recognition algorithm. In more specific embodiments, a Haar cascade can be used as a facial recognition algorithm. Using A Haar cascade can provide for a number of advantages over traditional computer systems, which are described in further details below. For example, a Haar cascade can comprise a machine learning algorithm that uses Haar-like features, which differentiate between different patterns with reference to intensity between two or more adjacent rectangles in or overlaid on an image. In many embodiments, a Haar-like feature can comprise one or more of an edge feature (two adjacent rectangles, one light and one dark), a line feature (three adjacent rectangles, two either light or dark and one in between them that is the opposite), and/or a four-rectangles feature (four adjacent rectangles with one light and three dark). In many embodiments, Haar features can be identified by summing an intensity (e.g., grayscale intensity) of each pixel in a rectangular portion of the feature, and then comparing an intensity of a dark portion of a feature to an intensity of a light portion of a feature. Haar features are particularly applicable to facial recognition algorithms because of the uniformity of the shadows that are cast on a human face. Further, the simple geometry of Haar features, which can comprise rectangles of different shades, enables a facial recognition algorithm to be run faster and/or on systems with reduced processing power (e.g., mobile computing devices).

Generally speaking, Haar cascades incorporate at least one of two factors that differentiate them from traditional machine learning algorithms: an integral image representation and an attentional cascade. In many embodiments, an integral image representation can generating a summed-area table. Generally speaking, a summed-area table can comprise a data structure where the value at any point (x, y) in the summed-area table is the sum of all the pixels above and to the left of (x, y), inclusive. Once the summed-area table has been computed, evaluating a sum of intensities over any rectangular area requires, at most, four array references regardless of the area size. In this way, an integral image representation can reduce a number of array references needed to determine the presence of different Haar features. This, in turn, enables a facial recognition algorithm to be run faster and/or on systems with reduced processing power (e.g., mobile computing devices).

In many embodiments, an attentional cascade can be seen as a subset of a cascading machine learning algorithm. In these or other embodiments, an attentional cascade can string together a number of weak classifiers (e.g., classifiers that are marginally better than chance) into a cascade to produce a strong classifier (e.g., on that can reliably detect a face). This can be accomplished by using a different classifier for each feature and then discarding features that return a negative result. In this way, the number of features passed through a cascading machine learning algorithm can be minimized early on in the process while at the same time providing a more accurate result.

In some embodiments, method 400 can optionally comprise an activity 407 of clustering a non-head remainder of a foreground. In many embodiments, activity 407 can be performed after or at a same time as activity 406. In these or other embodiments, activity 407 can be triggered by successful completion of all or a part of activity 406.

In various embodiments, a head region of a foreground can comprise a portion of a digital image identified as a foreground (e.g. such as in activity 403) and not in a head region (e.g., such as in activity 406). In other words, in some embodiments, a background and a head region of a digital image can be excluded from activity 407. Generally speaking, clustering algorithms (i.e. techniques for performing a clustering analysis) are configured to group sets of objects such that similar objects are grouped together into clusters. In various embodiments, a clustering algorithm can comprise a clustering image segmentation algorithm. In some embodiments, a clustering image segmentation algorithm can group pixels into one or more clusters. In these or other embodiments, each cluster of one or more clusters can be used to create one or more segments. For example, each cluster of the one or more clusters can be a segment and borders between each cluster can define boundaries between the segments. A number of different metrics exist for performing a clustering analysis on digital images. For example, colorimetric properties of the digital image can be used to create a similarity metric between one or more portions of the digital image (e.g., segments, pixels, groups of pixels, etc.), a distance between the one or more portions of the digital image can be used to create the similarity metric, and/or a machine learning algorithm can be trained to calculate the similarity metric based on one or more inputs.

In some embodiments, method 400 can optionally comprise an activity 408 of using a Gaussian mixture algorithm. In various embodiments, activity 408 can be performed concurrently and/or as a part of activities 405-407. In these or other embodiments, a clustering algorithm can comprise a Gaussian mixture model. Generally speaking, Gaussian mixture models assume that each cluster can be represented by a Gaussian (e.g., normal) distribution. In some embodiments, a Gaussian mixture model can be described as a probabilistic model. In various embodiments, a Gaussian mixture model can create clusters using an expectation-maximization (i.e., EM) algorithm. An EM algorithm can be considered an iterative approach that cycles between two modes. In many embodiments, a first step (i.e., the estimation step) attempts to estimate missing (i.e., latent) variables. In these or other embodiments, a second step (i.e., the maximization step) attempts to optimize parameters of the model to best explain the data. As applied to a clustering problem, a Gaussian mixture model includes an assumption that points for each cluster have a Gaussian probability distribution, but the points are combined and the distributions are similar enough that it is not obvious to which distribution a given point may belong. An EM algorithm can then proceed to an estimation step that estimates to which cluster each point belongs, and then a maximization step would optimize the clusters to maximize a density of clusters. This process is then repeated until a good set of clusters having a maximum likelihood is achieved. In many embodiments, a clustering algorithm can have a maximum number of clusters that can be created. In this way, a clustering algorithm can avoid problems where an image becomes over segmented and therefore inaccurate.

In many embodiments, after one or more of activities 404-408, method 400 can comprise an activity 409 of extracting one or more patches from one or more clusters. In many embodiments, one or more patches can be representative of one or more segments and/or one or more clusters of pixels in a digital image. In these or other embodiments, one or more patches can comprise a fabric swatch for a clothing item displayed in a digital image. For example, a patch can be extracted from a digital image of a clothed person or a clothed mannequin. As another example, a set of clothing can be displayed in a digital image and a patch can be extracted for each clothing item displayed.

In some embodiments, after activity 409, method 400 can optionally comprise an activity 410 of creating one or more matrices. In many embodiments, activity 410 can occur as a part of or at the same time as activity 409. In some embodiments, one or more matrices can have dimensions corresponding to dimensions of the digital image (e.g., a 100×100 matrix can be initialized for a 100×100 pixel digital image). In various embodiments, each cell of a matrix can contain a value representing a pixel in that position of a digital image. For example, a topmost left cell in a matrix would contain a value corresponding to a topmost left pixel in a digital image. In many embodiments, a matrix can be populated with values corresponding to a segment and/or a cluster assigned to a corresponding pixel. For example, a non-foreground portion (e.g., a background segment or cluster) can be assigned a 1, a 2 can be assigned to a skin and/or head region, and a 3 a can be assigned to a non-head remainder of a foreground. In embodiments where a non-head remainder of a foreground is clustered into multiple segments, each segment can be given the same or different values.

In many embodiments, one or more matrices extracted from a digital image can be used to extract a patch from a cluster displayed on a digital image. In various embodiments, an entire matrix can be sampled in a systematic fashion. For example, a sampling box can be slid across a matrix. In these or other embodiments, only select portions of the matrix can be sampled. In this way, processing times and/or burdens for sampling can be reduced, thereby allowing activity 409 to be performed on computing systems with reduced processing power (e.g., mobile or outdated computers). In some embodiments, a border of a digital image can be excluded from a sampling operation to reduced processing times and/or burdens. In these or other embodiments, a border can comprise a predetermined percentage or fraction of a digital image's area (e.g. ⅙, ⅕, ¼, etc.). In various embodiments, patches can be sampled from specific segments and/or clusters to reduce processing times and/or burdens. For example, a non-foreground portion (or each cluster/segment within a non-foreground portion) can be sampled.

In many embodiments, after activity 409 and optionally after activity 410, method 400 can comprise an activity 411 of determining one or more scores for one or more patches. In many embodiments, activity 411 can be performed concurrently or as a part of one or more of activities 409-410. In these or other embodiments, a score for a patch can signify whether the patch is representative of one or more items displayed in a digital image. For example, when an item is a clothing item, a patch can be representative of a color of the clothing item, a pattern of the clothing item, a style of the clothing item, a type of the clothing item, etc. In various embodiments, a score can comprise a weighted sum of values in the 50*50 pixel patch plus and variance of color vectors of the same area in the original query image. In many embodiments, a score can be configured to identify a dominant color segment in a digital image.

In many embodiments, a score calculation for a patch can begin by defining a 2D coordinate system for the patch. For example, in a 50×50 pixel patch, a 2D coordinate system can comprise $(i_k, j_k)$ where k=1,2, . . . 50. In various embodiments, a matrix extracted in activity 410 can be represented by S. In these or other embodiments, a value in matrix S can be represented by $s_{i,j}$ and $a_{i,j}=(z_{i,j,1}, z_{i,j,2}, z_{i,j,3})^t$ can represent an RGB color vector of the pixel represented by $s_{i,j}$. In these or other embodiments, a score can then be calculated using equation 1 below.

$$\alpha \sum_i \sum_j s_{i,j} + \beta \frac{\sum_c \sum_i \sum_j (z_{i,j,c} - \bar{z}_c)^2}{N} \quad (1)$$

where α and β comprise predetermined coefficients, N comprises three times the area of the patch, and c comprises each of three color dimensions in a red, green, and blue color space. In many embodiments, a score can be calculated one or more samples and a sample with a lowest score can be chosen as the patch.

In many embodiments, method 400 can comprise an activity 412 of coordinating displaying a patch on an electronic display of an electronic device based on one or more scores. In these or other embodiments, a sample with a lowest score can be displayed as a patch. In some embodiments, a patch can be displayed on a GUI (e.g., GUIs 350-352 (FIG. 3)) of the electronic display. In various embodiments, a patch can be used as a search filter for a search query. In these or other embodiments, a patch can be used to cycle through different items displayed on a GUI and/or recolor the items displayed.

Figure 5:
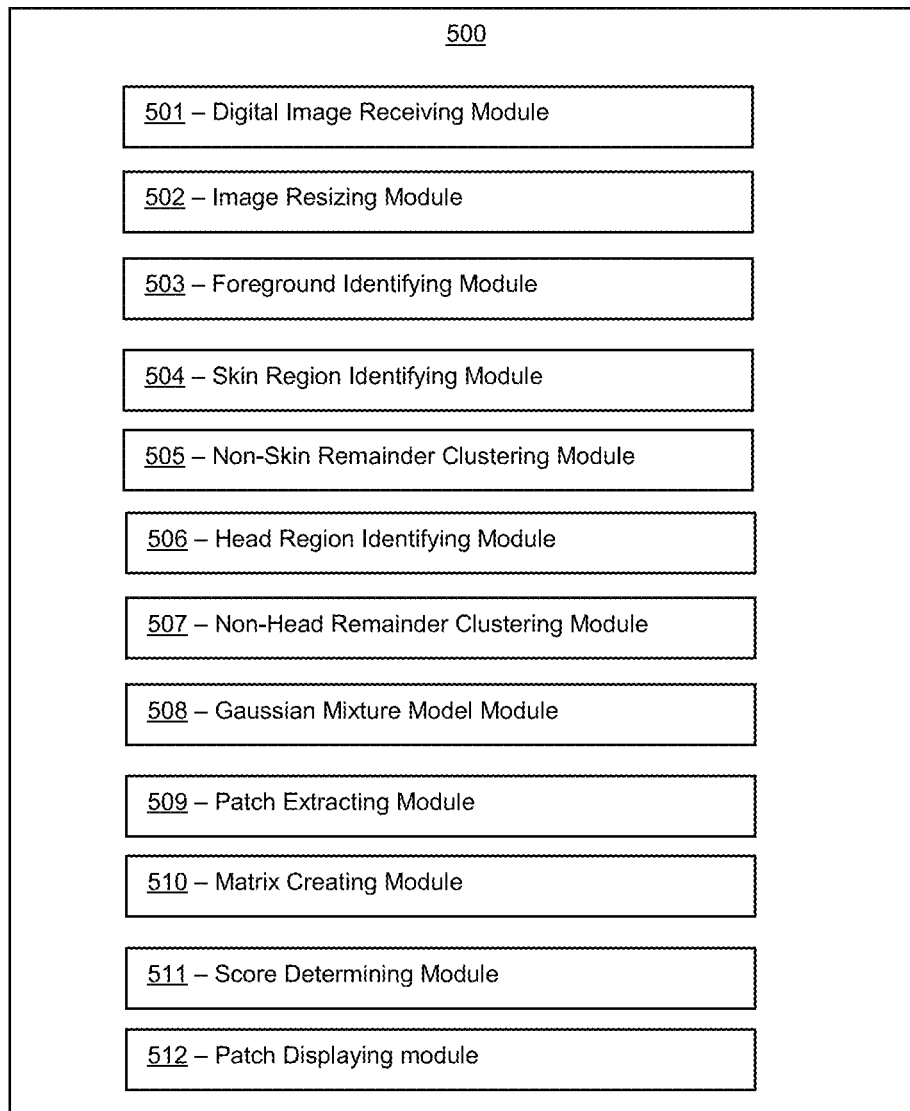
FIG. 5 illustrates a representative block diagram of a system, according to an additional embodiment.

Turning ahead in the drawings, FIG. 5 illustrates a block diagram of a system 500 that can be employed for behavior based messaging. System 500 is merely exemplary and embodiments of the system are not limited to the embodiments presented herein. System 500 can be employed in many different embodiments or examples not specifically depicted or described herein. In some embodiments, certain elements or modules of system 500 can perform various procedures, processes, and/or activities. In these or other embodiments, the procedures, processes, and/or activities can be performed by other suitable elements or modules of system 500.

Generally, therefore, system 500 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 500 described herein.

In many embodiments, system 500 can comprise non-transitory memory storage module 501. Memory storage module 501 can be referred to as digital image receiving module 501. In many embodiments, digital image receiving module 501 can store computing instructions configured to run on one or more processing modules and perform one or more acts of method 400 (FIG. 4) (e.g., activity 401 (FIG. 4)).

In many embodiments, system 500 can comprise optional non-transitory memory storage module 502. Memory storage module 502 can be referred to as image resizing module 502. In many embodiments, image resizing module 502 can store computing instructions configured to run on one or more processing modules and perform one or more acts of method 400 (FIG. 4) (e.g., activity 402 (FIG. 4)).

In many embodiments, system 500 can comprise non-transitory memory storage module 503. Memory storage module 503 can be referred to as foreground identifying module 503. In many embodiments, foreground identifying module 503 can store computing instructions configured to run on one or more processing modules and perform one or more acts of method 400 (FIG. 4) (e.g., activity 403 (FIG. 4)).

In many embodiments, system 500 can comprise optional non-transitory memory storage module 504. Memory storage module 504 can be referred to as skin region identifying module 504. In many embodiments, skin region identifying module 504 can store computing instructions configured to run on one or more processing modules and perform one or more acts of method 400 (FIG. 4) (e.g., activity 404 (FIG. 4)).

In many embodiments, system 500 can comprise optional non-transitory memory storage module 505. Memory storage module 505 can be referred to as non-skin remainder clustering module 505. In many embodiments, non-skin remainder clustering module 505 can store computing instructions configured to run on one or more processing modules and perform one or more acts of method 400 (FIG. 4) (e.g., activity 405 (FIG. 4)).

In many embodiments, system 500 can comprise optional non-transitory memory storage module 506. Memory storage module 506 can be referred to as head region identifying module 506. In many embodiments, head region identifying module 506 can store computing instructions configured to run on one or more processing modules and perform one or more acts of method 400 (FIG. 4) (e.g., activity 406 (FIG. 4)).

In many embodiments, system 500 can comprise optional non-transitory memory storage module 507. Memory storage module 507 can be referred to as non-head remainder clustering module 507. In many embodiments, non-head remainder clustering module 507 can store computing instructions configured to run on one or more processing modules and perform one or more acts of method 400 (FIG. 4) (e.g., activity 407 (FIG. 4)).

In many embodiments, system 500 can comprise optional non-transitory memory storage module 508. Memory storage module 508 can be referred to as Gaussian mixture model module 508. In many embodiments, Gaussian mixture model module 508 can store computing instructions configured to run on one or more processing modules and perform one or more acts of method 400 (FIG. 4) (e.g., activity 408 (FIG. 4)).

In many embodiments, system 500 can comprise non-transitory memory storage module 509. Memory storage module 509 can be referred to as patch extracting module 509. In many embodiments, patch extracting module 509 can store computing instructions configured to run on one or more processing modules and perform one or more acts of method 400 (FIG. 4) (e.g., activity 409 (FIG. 4)).

In many embodiments, system 500 can comprise optional non-transitory memory storage module 510. Memory storage module 510 can be referred to as matrix creating module 510. In many embodiments, matrix creating module 510 can store computing instructions configured to run on one or more processing modules and perform one or more acts of method 400 (FIG. 4) (e.g., activity 410 (FIG. 4)).

In many embodiments, system 500 can comprise non-transitory memory storage module 511. Memory storage module 511 can be referred to as score determining module 511. In many embodiments, score determining module 511 can store computing instructions configured to run on one or more processing modules and perform one or more acts of method 400 (FIG. 4) (e.g., activity 410 (FIG. 4)).

In many embodiments, system 500 can comprise non-transitory memory storage module 512. Memory storage module 512 can be referred to as patch displaying module 512. In many embodiments, patch displaying module 512 can store computing instructions configured to run on one or more processing modules and perform one or more acts of method 400 (FIG. 4) (e.g., activity 410 (FIG. 4)).

Although systems and methods for extracting patches from digital images have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable storage devices storing computing instructions configured to run on the one or more processors and perform:
   receiving one or more digital images;
   identifying a foreground of the one or more digital images;
   analyzing the foreground of the one or more digital images to identify a skin region in the foreground of the one or more digital images;
   when the skin region is identified, clustering a non-skin remainder of the foreground of the one or more digital images into one or more clusters;
   when the skin region is not identified, analyzing the foreground of the one or more digital images to identify a head region in the foreground of the one or more digital images;
   when the head region is identified, clustering a non-head remainder of the foreground of the one or more digital images into the one or more clusters;
   extracting one or more patches of the one or more digital images from the one or more clusters of the foreground of the one or more digital images;
   determining one or more scores for the one or more patches of the one or more digital images; and
   coordinating displaying a patch of the one or more patches on an electronic display based on the one or more scores for the one or more patches.

2. The system of claim 1, wherein the one or more non-transitory computer-readable storage devices storing the computing instructions are further configured to run on the one or more processors and perform:
   after receiving the one or more digital images, resizing the one or more digital images to a common size.

3. The system of claim 1, wherein identifying the foreground of the one or more digital images comprises:
   using an image segmentation algorithm to identify the foreground of the one or more digital images.

4. The system of claim 1, wherein the one or more non-transitory computer-readable storage devices storing the computing instructions are further configured to run on the one or more processors and perform:
   determining, using one or more colorimetric properties of the one or more digital images, the skin region in the digital images by identifying pixels within a predetermined color range labeled as the skin region.

5. The system of claim 1, wherein clustering the non-skin remainder of the foreground of the one or more digital images into the one or more clusters comprises:
   using a Gaussian mixture model to cluster the non-skin remainder of the foreground of the one or more digital images into the one or more clusters.

6. The system of claim 1, wherein extracting the one or more patches of the one or more digital images from the one or more clusters of the foreground of the one or more digital images comprises:
   creating one or more matrices from the one or more digital images; and
   extracting the one or more patches of the one or more digital images from the one or more clusters of the foreground of the one or more digital images using the one or more matrices.

7. The system of claim 6, wherein each matrix of the one or more matrices comprises:
   respective matrix dimensions matching image dimensions of a corresponding digital image of the one or more digital images; and
   a respective entry for each respective pixel in the corresponding digital image of the one or more digital images.

8. The system of claim 7, wherein the respective entry for each respective pixel identifies each respective pixel as:
   a background pixel when the respective pixel is not in the foreground;
   a skin pixel when the respective pixel is in the skin region; and
   a clustered pixel when the respective pixel is clustered into the one or more clusters.

9. The system of claim 1, wherein the one or more clusters comprises a maximum of three clusters.

10. The system of claim 1, wherein the one or more scores for the one or more patches indicate one or more probabilities of the one or more patches being representative of an item in the one or more digital images.

11. A method implemented via execution of computing instructions configured to run at one or more processors and configured to be stored at non-transitory computer-readable media, the method comprising:
receiving one or more digital images;
identifying a foreground of the one or more digital images;
analyzing the foreground of the one or more digital images to identify a skin region in the foreground of the one or more digital images;
when the skin region is identified, clustering a non-skin remainder of the foreground of the one or more digital images into one or more clusters;
when the skin region is not identified, analyzing the foreground of the one or more digital images to identify a head region in the foreground of the one or more digital images;
when the head region is identified, clustering a non-head remainder of the foreground of the one or more digital images into the one or more clusters;
extracting one or more patches of the one or more digital images from the one or more clusters of the foreground of the one or more digital images;
determining one or more scores for the one or more patches of the one or more digital images; and
coordinating displaying a patch of the one or more patches on an electronic display based on the one or more scores for the one or more patches.

12. The method of claim 11 further comprising:
after receiving the one or more digital images, resizing the one or more digital images to a common size.

13. The method of claim 11, wherein identifying the foreground of the one or more digital images comprises:
using an image segmentation algorithm to identify the foreground of the one or more digital images.

14. The method of claim 11 further comprising:
determining, using one or more colorimetric properties of the one or more digital images, the skin region in the digital images by identifying pixels within a predetermined color range labeled as the skin region.

15. The method of claim 11, wherein clustering the non-skin remainder of the foreground of the one or more digital images into the one or more clusters comprises:
using Gaussian mixture model to cluster the non-skin remainder of the foreground of the one or more digital images into the one or more clusters.

16. The method of claim 11, wherein extracting the one or more patches of the one or more digital images from the one or more clusters of the foreground of the one or more digital images comprises:
creating one or more matrices from the one or more digital images; and
extracting the one or more patches of the one or more digital images from the one or more clusters of the foreground of the one or more digital images using the one or more matrices.

17. The method of claim 16, wherein each matrix of the one or more matrices comprises:
respective matrix dimensions matching image dimensions of a corresponding digital image of the one or more digital images; and
a respective entry for each respective pixel in the corresponding digital image of the one or more digital images.

18. The method of claim 17, wherein the respective entry for each respective pixel identifies each respective pixel as:
a background pixel when the respective pixel is not in the foreground;
a skin pixel when the respective pixel is in the skin region; and
a clustered pixel when the respective pixel is clustered into the one or more clusters.

19. The method of claim 11, wherein the one or more clusters comprises a maximum of three clusters.

20. The method of claim 11, wherein the one or more scores for the one or more patches indicate one or more probabilities of the one or more patches being representative of an item in the one or more digital images.

* * * * *